United States Patent
Akutsu et al.

(10) Patent No.: US 8,810,878 B2
(45) Date of Patent: Aug. 19, 2014

(54) OPTICAL DEVICE AND VIRTUAL IMAGE DISPLAY

(71) Applicant: Sony Corporation, Tokyo (JP)

(72) Inventors: Katsuyuki Akutsu, Kanagawa (JP); Satoshi Nakano, Kanagawa (JP); Hiroshi Mukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/677,588

(22) Filed: Nov. 15, 2012

(65) Prior Publication Data

US 2013/0077141 A1    Mar. 28, 2013

Related U.S. Application Data

(63) Continuation of application No. 12/481,284, filed on Jun. 9, 2009, now Pat. No. 8,325,166.

(30) Foreign Application Priority Data

Jun. 10, 2008    (JP) ................. 2008-151430

(51) Int. Cl.
*G03H 1/00*    (2006.01)
*G02B 5/32*    (2006.01)

(52) U.S. Cl.
USPC .............................. 359/34; 359/15

(58) Field of Classification Search
USPC .......................................................... 359/34
See application file for complete search history.

(56) References Cited

U.S. PATENT DOCUMENTS

| | | | |
|---|---|---|---|
| 7,418,170 B2 * | 8/2008 | Mukawa et al. | 385/31 |
| 7,453,612 B2 * | 11/2008 | Mukawa | 359/15 |
| 2006/0228073 A1 | 10/2006 | Mukawa et al. | |
| 2006/0291021 A1 | 12/2006 | Mukawa | |

FOREIGN PATENT DOCUMENTS

| | | |
|---|---|---|
| EP | 1 536 268 | 6/2005 |
| EP | 1 619 536 | 1/2006 |
| JP | 2007-094175 | 4/2007 |
| JP | 2008-020770 | 1/2008 |
| JP | 2008-058776 | 3/2008 |
| JP | 2008-058777 | 3/2008 |
| JP | 2009-133998 | 6/2009 |
| WO | 2005-093493 | 10/2005 |

OTHER PUBLICATIONS

International Search Report dated Sep. 10, 2009, for corresponding Patent Application EP 09006129.2.
EP Search Report dated May 12, 2011, for corresponding Patent Application EP 09006129.2.
Japanese Office Action issued on Jan. 19, 2010 for corresponding JP2008-151430.

* cited by examiner

*Primary Examiner* — Jade R Chwasz
(74) *Attorney, Agent, or Firm* — K&L Gates LLP

(57) ABSTRACT

An optical device includes: a light guide plate receiving, for each of N types of wavelength bands, a plurality of parallel light beams with different incident angles each corresponding to view angles, and guiding the received parallel light beams; a first and a second volume hologram gratings of reflection type having a diffraction configuration which includes N types of interference fringes each corresponding to the N types of wavelength bands, and diffracting/reflecting the parallel light beams. The optical device satisfies for each wavelength band, a relationship of 'P>L', where 'L' represents a central diffraction wavelength in the first and second volume hologram gratings, defined for a parallel light beam corresponding to a central view angle, and 'P' represents a peak wavelength of the parallel light beams.

10 Claims, 19 Drawing Sheets

| VIEW ANGLE θ | TOTAL INNER REFLECTION ANGLE | CENTRAL DIFFRACTION WAVELENGTH (μm) |
|---|---|---|
| 8.000 | 45.750 | 0.660 |
| 7.200 | 46.274 | 0.658 |
| 6.400 | 46.797 | 0.655 |
| 5.600 | 47.322 | 0.653 |
| 4.800 | 47.846 | 0.651 |
| 4.000 | 48.371 | 0.648 |
| 3.200 | 48.897 | 0.646 |
| 2.400 | 49.422 | 0.643 |
| 1.600 | 49.948 | 0.640 |
| 0.800 | 50.474 | 0.638 |
| 0.000 | 51.000 | 0.635 |
| -0.800 | 51.526 | 0.632 |
| -1.600 | 52.052 | 0.629 |
| -2.400 | 52.578 | 0.626 |
| -3.200 | 53.103 | 0.623 |
| -4.000 | 53.629 | 0.620 |
| -4.800 | 54.154 | 0.617 |
| -5.600 | 54.678 | 0.614 |
| -6.400 | 55.203 | 0.611 |
| -7.200 | 55.726 | 0.608 |
| -8.000 | 56.250 | 0.605 |

FIG. 6

OPTICAL DEVICE AND VIRTUAL IMAGE DISPLAY

CROSS REFERENCES TO RELATED APPLICATIONS

The present application is a continuation of U.S. application Ser. No. 12/481,284, filed on Jun. 9, 2009, and claims priority to Japanese Priority Patent Application JP 2008-151430 filed in the Japanese Patent Office on Jun. 10, 2008, the entire contents of which are hereby incorporated by reference.

BACKGROUND

The present application relates to an optical device and a virtual image display for guiding display image light as a virtual image to viewer's pupils through the use of a reflection type volume hologram grating.

International Publication No. 2005/093493 pamphlet proposes a device allowing a viewer to observe a two-dimensional image displayed on an image display element as an enlarged virtual image by a virtual image optical system using a reflection type volume hologram grating. The device is a display applicable as, for example, an HMD (Head Mounted Display). FIG. 18 illustrates a configuration example of a virtual image display 80 proposed by International Publication No. 2005/093493 pamphlet.

The virtual image display 80 includes an image display element 81 displaying an image, and a virtual image optical system receiving display light displayed on the image display element 81 and then guiding the display light to a viewer's pupil 16. The image display element 81 is, for example, an organic EL (Electro Luminescence) display, an inorganic EL display, a liquid crystal display (LCD) or the like. The virtual image optical system includes a collimating optical system 82 and a light guide plate 83 including a hologram layer 84 arranged therein. The collimating optical system 82 is an optical system receiving light beams emitted from pixels of the image display element 81, and then converting the light beams into a plurality of parallel light beams with different view angles. The plurality of parallel light beams with different view angles emitted from the collimating optical system 82 enters the light guide plate 83.

FIG. 18 illustrates, as a representative of the parallel light beams, only a parallel light beam L10 with a central view angle which is emitted from a pixel in a central part of the image display element 81, and then converted into a light beam with a zero view angle (vertical to an incident surface of the light guide plate 83) by the collimating optical system 82 to enter the light guide plate 83.

The light guide plate 83 has a configuration in which the hologram layer 84 is sandwiched between transparent substrates 83A and 83B. The light guide plate 83 is a light guide plate in the shape of a thin parallel plate including, as main surfaces, an optical surface 83a and an optical surface 83b facing the optical surface 83a. The optical surface 83a has a light inlet 83a1 at one end thereof to receive the parallel light beams with different view angles emitted from the collimating optical system 82. The optical surface 83a has a light outlet 83a2 at the other end thereof to emit light. Protective sheets 85 and 86 for protecting the optical surfaces 83a and 83b are arranged on the optical surfaces 83a and 83b of the light guide plate 83, respectively. Moreover, a light-shielding plate 87 is arranged on the protective sheet 86 arranged on the optical surface 83b in the same position as that of the light inlet 83a1 of the light guide plate 83 to prevent a decline in light use efficiency caused by leakage of an enlarged image displayed on the image display element 81 and enlarged by the collimating optical system 81 to outside of the light guide plate 83.

In the hologram layer 84, a first reflection type volume hologram grating 84a, hereinafter described as a first grating 84a, is formed in a position corresponding to the light inlet 83a1, and a second reflection type volume hologram grating 84c, hereinafter described as a second grating 84c, is formed in a position corresponding to the light outlet 83a2. A section where the first and second gratings 84a and 84c are not formed of the hologram layer 84 is a non-interference-fringe-recording region 84b where interference fringes are not recorded. In the first grating 84a, interference fringes are recorded with uniform pitches on a hologram surface. Moreover, in the second grating 84c, interference fringes having different diffraction efficiency depending on their positions are recorded. The second grating 84c has lower diffraction efficiency in a position near the light inlet 83a1 and higher diffraction efficiency in a position far from the light inlet 83a1 so that light is allowed to be diffracted and reflected a plurality of times.

The parallel light beams with different view angles entering from the light inlet 83a1 of the light guide plate 83 enter the above-described first grating 84a, and each of the parallel light beams is diffracted and reflected as it is. The diffracted and reflected parallel light beams travel while being totally reflected between the optical surfaces 83a and 83b of the light guide plate 83 to enter the above-described second grating 84c. The light guide plate 83 is designed to have a sufficient length in a longitudinal direction and a thin thickness between the optical surface 83a and the optical surface 83b so as to have such an optical path length that numbers of times of the total reflection of the parallel light beams with different view angles, while traveling inside the light guide plate 83 until the parallel light beams active at the second reflection grating 84c, depend on their view angles.

More specifically, among the parallel light beams entering the light guide plate 83, a parallel light beam entering the light guide plate 83 while being slanted toward the second grating 84c, that is, a parallel light beam with a large incident angle is reflected a smaller number of times than a parallel light beam entering the light guide plate 83 while being hardly slanted toward the second grating 84c, that is, a parallel light beam with a small incident angle, because the parallel light beams entering the light guide plate 83 have different view angles from one another. In other words, the incident angles of the parallel light beams to the first grating 84a are different from one another, so the parallel light beams are diffracted and reflected at different diffraction angles, thereby leading to total reflection at different angles. Therefore, when the light guide plate 83 has a lower profile and maintains a sufficient length in the longitudinal direction, the numbers of times of the total reflection of the parallel light beams are pronouncedly different from one another.

The parallel light beams with different view angles which enter the second grating 84c are diffracted and reflected thereby to deviate from conditions of total reflection, and then the parallel light beams are emitted from the light outlet 83a2 of the light guide plate 83 to enter the viewer's pupil 16.

In the virtual image display 80, when the diffraction efficiency of the second grating 84a is changed depending on position, a pupil diameter, that is, the virtual image viewable range of the viewer is expanded. More specifically, for example, when the diffraction efficiency of the second grating 84c is 40% in a position 84c1 near the light inlet 83a1 and 70% in a position 84c2 far from the light inlet 83a1, 40% of the parallel light beams entering the second grating 84c for the first time is diffracted and reflected in the position 84c1, and 60% of the parallel light beams passes through. The parallel light beams having passing through are totally reflected inside the light guide plate 83, and enter the position 84c2 of the second grating 84c.

The diffraction efficiency in the position 84c2 is 70%, so 60% of the parallel light beams passes through in the first entry into the second grating 84c, so 42% (0.6×0.7=0.42) of the parallel light beams is diffracted and reflected in the position 84c2. Thus, when the diffraction efficiency is appropriately changed depending on the position of the second grating 84c, the light intensity balance of light emitted from the light outlet 83a2 may be kept. Therefore, when a region in which the interference fringes are recorded of the second grating 84c is increased in the hologram layer 84, the virtual image viewable range is easily expanded.

SUMMARY

However, in the virtual image display 80, as described above, among the parallel light beams entering the light guide plate 83, the number of times a parallel light beam entering the light guide plate 83 while being slanted toward the second grating 84c, that is, a parallel light beam with a large incident angle is reflected a smaller number of times than a parallel light beam entering the light guide plate 83 while being hardly slanted toward the second grating 84c, that is, a parallel light beam with a small incident angle. Therefore, the numbers of times the light beams with different view angles are diffracted and reflected in the second grating 84c are different from one another, so it is difficult to keep the light intensity between the light beams with different view angles. Referring to FIGS. 19 and 20, an issue about the light intensity balance between the light beams with different view angles will be described below. FIGS. 19 and 20 illustrate simplified views of an optical system which is substantially equivalent to a configuration of a section on the second grating 84c side of the virtual image display 80 illustrated in FIG. 18.

As illustrated in FIG. 19, a distance from a viewer's pupil position O to the second grating 84c is S, and a light beam with a reference view angle V is diffracted and reflected from a position X in the second grating 84c. At this time, in a position X±θ where light beams with a view angle ±θ is diffracted and reflected from the second grating 84c is represented by the following expression in the case where the refractive index of the light guide plate 83 is approximately ignored.

$$X±θ=X+S·\tan(±θ)$$

In this case, the view angle is an angle with respect to a normal 100 to a surface of the light guide plate 83 (a surface of the second grating 84c). The light beam with the reference view angle V is a light beam which enters vertically into an incident surface of the light guide plate 83, and then is emitted vertically from an emission surface of the light guide plate 83. That is, the reference view angle V is 0 degrees.

A distance $(X_+θ-X_-θ)$ between a position $X_+θ$ and a position $X_-θ$ is a necessary width of the second grating 84c in the viewer's pupil position O. Moreover, the diffraction-reflection angle γ of a parallel light beam in a wavelength band λ entering the first grating 84a with a surface pitch p at an incident angle φ is represented by the following expression. In this case, the incident angle and the diffraction-reflection angle γ are angles with respect to a normal to a surface of the first grating 84a. Further, "n" represents the refractive index of a medium.

$$γ=\arcsin(λ/np-\sin φ)$$

Thus, an angle at which the parallel light beams for the wavelength band λ are totally reflected inside the light guide plate 83 is changed with a change in the incident angle φ. Therefore, as illustrated in FIG. 20, a number $R_+θ$ of times a parallel light beam with an view angle +θ entering the viewer's pupil is diffracted and reflected in the second grating 83c until the parallel light beam arrives at the position $X_+θ$ and a number Rv of times the parallel light beam with the reference view angle V is diffracted and reflected in the second grating 83c until the parallel light beam arrives at the position X are represented by the following expressions in the case where the reflection position $X_-θ$ of a light beam with a view angle -θ is a starting point.

$$R_+θ=(X_+θ-X_-θ)/(t·\tan(a \sin(λ/np-\sin(+θn))))$$

$$Rv=-(X_-θ)/(t·\tan(a \sin(λ/np)))$$

In this case, "+θn" is an angle at which the light beam with the view angle +θ enters a light guide plate medium with the refractive index n.

Thereby, for example, under the following conditions, the number Rv of times the light beam with the reference view angle V is diffracted and reflected is 2 in an observation position O (i.e., viewer's pupil position), but it is necessary for a light beam with a view angle of +8 degrees to be diffracted and reflected four times, and it is necessary for a light beam with a view angle of -8 degrees to be diffracted and reflected once.

Surface pitches p of the first and second grating=0.55 μm
Wavelength band λ (peak wavelength) of a light beam entering the light guide plate=635 nm
Distance S to the second grating=15 mm
Thickness t of the light guide plate=1 mm
Refractive index n of the light guide plate=1.52
Peripheral view angle ±θ=±8 degrees
Reference view angle V=0 degrees In International Publication No. 2005/093493 pamphlet, the diffraction efficiency of the second grating 84c illustrated in FIG. 18 is changed depending on position. For example, in the case where the diffraction efficiency is changed to 40% and 70% depending on position with reference to the reference view angle V as a reference, in the case of a light beam with a view angle of +8 degrees, only a light intensity of 18% remains when the light beam is diffracted and reflected for the second or subsequent times, and most of the light intensity is lost. In other words, a light beam with such a view angle that the light beam is diffracted and reflected for a larger number of times by the second grating 84c has a smaller light intensity.

As described above, in the virtual image display described in International Publication No. 2005/093493 pamphlet, in the case where light beams with one view angle (the reference view angle V) are used, the virtual image viewable range may be expanded while keeping the light intensity balance. However, when virtual images are intended to be observed within a viewer's pupil range with regard to parallel light beams with a plurality of view angles, it is difficult to keep a light intensity balance between the parallel light beams with different view angles, because the numbers of times parallel light beams with different view angles are diffracted and reflected in the second grating 83c are different from one another. Therefore, unevenness in brightness in observed virtual images occurs.

It is desirable to provide an optical device and a virtual image display capable of favorably keeping a light intensity balance between light beams with different view angles and capable of observing virtual images with less unevenness in brightness.

According to an embodiment, there is provided An optical device including: a light guide plate receiving, for each of N kinds (N is an integer of 1 or more) of wavelength bands, a plurality of parallel light beams with different incident angles each corresponding to view angles within a predetermined view angle range, each of the parallel light beams traveling in parallel, and the light guide plate guiding the received parallel light beams according to principle of total inner reflection; a first volume hologram grating of reflection type having a diffraction configuration which includes N kinds of interference fringes each corresponding to the N kinds of wavelength bands, and diffracting and reflecting the parallel light beams which have entered the light guide plate, so as to be reflected inside the light guide plate according to the principle of total inner reflection; and a second volume hologram grating of reflection type having a diffraction configuration which includes N kinds of interference fringes each corresponding to the N kinds of wavelength bands, and diffracting and reflecting the parallel light beams which have propagated inside the light guide plate according to the principle of total inner reflection, so as to be emitted from the light guide plate as they are in parallel, respectively, in which the optical device is configured, for a wavelength band selected from the N kinds of wavelength bands, to satisfy a relationship of 'P>L', where 'L' represents a central diffraction wavelength in the first and second volume hologram gratings, the central diffraction wavelength being defined for a parallel light beam corresponding to a central view angle, and 'P' represents a peak wavelength of the parallel light beams which is to enter the light guide plate.

According to an embodiment, there is provided A virtual image display including: an image forming section displaying an image through the use of light for N kinds (N is an integer of 1 or more) of wavelength bands; a collimating optical system converting light beams for the N kinds of wavelength bands emitted from the image forming section into parallel light beams; a light guide plate receiving, through the collimating optical system, for each of N kinds of wavelength bands, a plurality of parallel light beams with different incident angles each corresponding to view angles within a predetermined view angle range, each of the parallel light beams traveling in parallel, and the light guide plate guiding the received parallel light beams according to principle of total inner reflection; a first volume hologram grating of reflection type having a diffraction configuration which includes N kinds of interference fringes each corresponding to the N kinds of wavelength bands, and diffracting and reflecting the parallel light beams which have entered the light guide plate, so as to be reflected inside the light guide plate according to the principle of total inner reflection; and a second volume hologram grating of reflection type having a diffraction configuration which includes N kinds of interference fringes each corresponding to the N kinds of wavelength bands, and diffracting and reflecting the parallel light beams which have propagated inside the light guide plate according to the principle of total inner reflection, so as to be emitted from the light guide plate as they are in parallel, respectively, in which the optical device is configured, for a wavelength band selected from the N kinds of wavelength bands, to satisfy a relationship of 'P>L', where 'L' represents a central diffraction wavelength in the first and second volume hologram gratings, the central diffraction wavelength being defined for a parallel light beam corresponding to a central view angle, and 'P' represents a peak wavelength of the parallel light beams which is to enter the light guide plate.

In the optical device or the virtual image display according to an embodiment, a plurality of parallel light beams enter with different incident angles each corresponding to view angles within a predetermined view angle range. The plurality of parallel light beams which have entered the light guide plate are diffracted and reflected in the first and second volume hologram gratings to be emitted from the light guide plate. At this time, the peak wavelength P of the parallel light beams which is to enter the light guide plate and the central diffraction wavelength L in the first and second volume hologram gratings satisfy a relationship of P>L. Therefore, for each of the wavelength bands, the peak wavelength P of the parallel light beams is brought near a central diffraction wavelength of a light beam with a view angle which is diffracted and reflected a large number of times in the second volume hologram grating thereby to compensate for a decline in light intensity of the light beam with the view angle which is diffracted and reflected a large number of times in the second volume hologram grating, and the light intensity balance between light beams with different view angles is favorably maintained.

In the optical device according to an embodiment, the central diffraction wavelength L in the first and second volume hologram gratings and the peak wavelength P of the parallel light beams which is to enter the light guide plate satisfy a predetermined relationship so as to compensate for a decline in light intensity of the light beam with a view angle which is diffracted and reflected a large number of times in the second volume hologram grating. Therefore, the light intensity balance between light beams with different view angles is favorably maintained, and virtual images with less unevenness in brightness are viewable when the optical device is used in a virtual image display.

In the virtual image display according to an embodiment, the central diffraction wavelength L in the first and second volume hologram gratings and the peak wavelength P of the parallel light beams which to be enter the light guide plate satisfy a predetermined relationship so as to compensate for a decline in light intensity of a light beam with a view angle diffracted and reflected a large number of times in the second volume hologram grating. Therefore, the light intensity balance between light beams with different view angles is favorably maintained, and virtual images with less unevenness in brightness are viewable.

Additional features and advantages are described in, and will be apparent from, the following Detailed Description and the figures.

BRIEF DESCRIPTION OF THE FIGURES

FIG. 6 is an illustration of a relationship between an incident view angle and a central diffraction wavelength in the first and the second reflection type volume hologram gratings.

DETAILED DESCRIPTION

The present application will be described in detail below referring to the accompanying drawings according to an embodiment.

Figure 1:
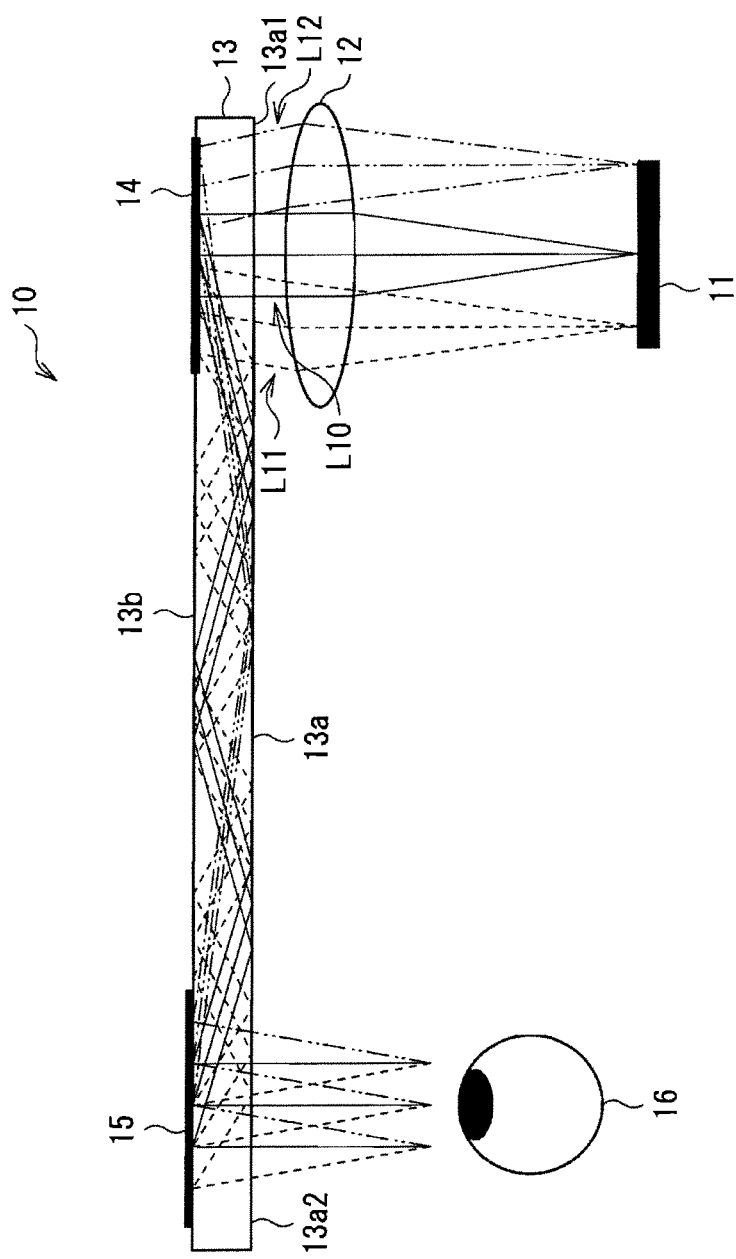
FIG. 1 is a side view illustrating a configuration example of a virtual image display according to an embodiment.

FIG. 1 illustrates a configuration example of a virtual image display 10 according to an embodiment. The virtual image display 10 includes an image display element 11 as an image forming section displaying an image, and a virtual image optical system receiving display light displayed on the image display element 11 to guide the display light to a viewer's pupil 16. The image display element 11 is, for example, an organic EL display, an inorganic EL display, a liquid crystal display or the like. The image display element 11 displays an image through the use of light for N kinds (N is an integer of 1 or more) of wavelength bands. For example, in the case where color display is performed, an image is displayed through the use of light for a red wavelength band (red light), light for a green wavelength band (green light) and light for a blue wavelength band (blue light).

The virtual image optical system includes a collimating optical system 12, a light guide plate 13, a first reflection type volume hologram grating 14 and a second reflection type volume hologram grating 15 both of which are arranged on the light guide plate 13.

The collimating optical system 12 is an optical system receiving, for each of N kinds of wavelength bands, emitted from pixels of the image display element 11, and then converting the light beams into a plurality of parallel light beams with different view angles for each of the wavelength bands. The plurality of parallel light beams with different view angles enter the light guide plate 13.

Figure 19:
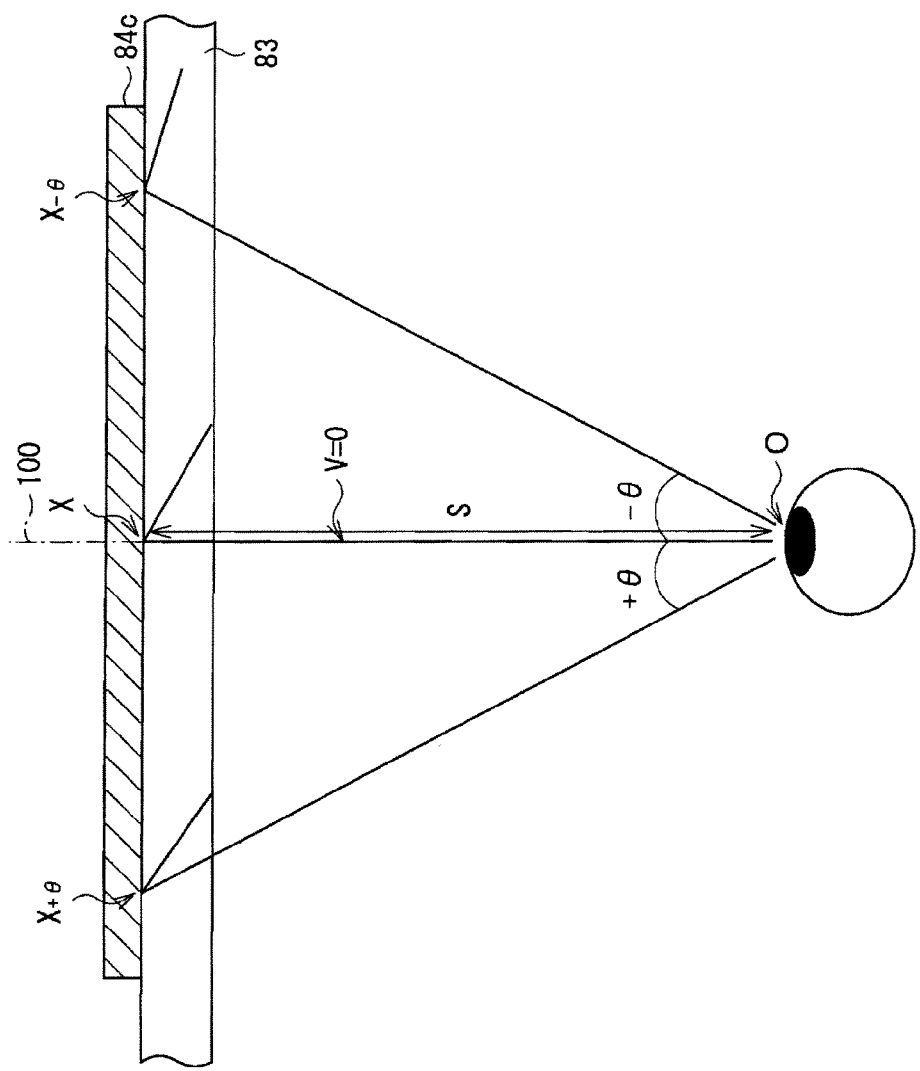
FIG. 19 is an illustration describing a diffraction-reflection position in a second reflection type volume hologram grating of the virtual image display in related art.
Figure 20:
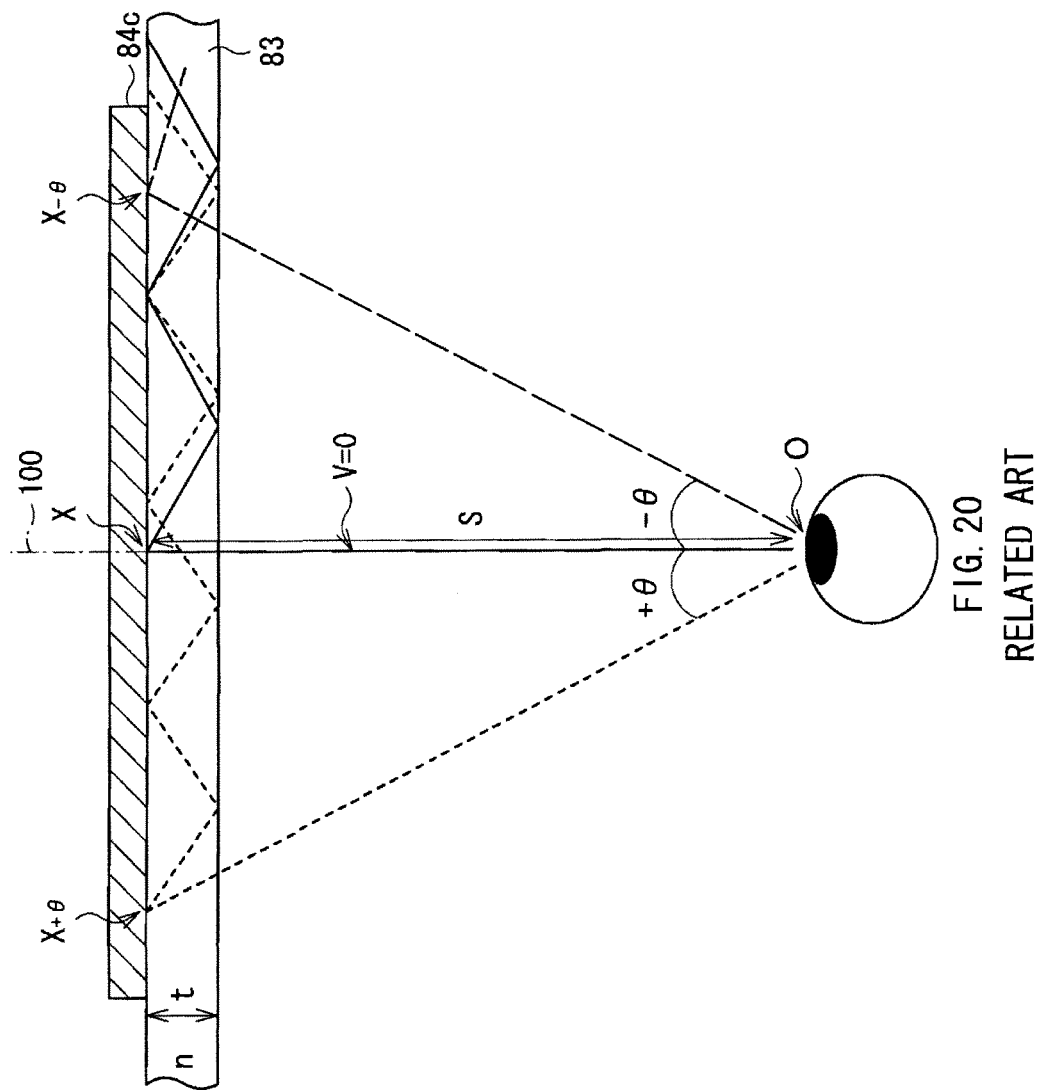
FIG. 20 is an illustration describing a relationship between the diffraction-reflection position in the second reflection type volume hologram grating of the virtual image display in related art, an observation view angle and the number of diffraction-reflections.

In FIG. 1, as the plurality of parallel light beams, three parallel light beams L10, L11 and L12 with different view angles are illustrated. Moreover, in FIG. 1, to easily understand the state of light rays traveling inside the light guide plate 13, the numbers of times the light rays are reflected inside the light guide plate 13 are reduced to simplify the drawing. The parallel light beam L10 is a light beam with a central view angle which is emitted from a pixel in a central section of the image display element 11, and is converted into a light beam with a zero view angle (vertical to an incident surface of the light guide plate 13) by the collimating optical system 12 to enter the light guide plate 13. The parallel light beam L10 corresponds to a light beam with a reference view angle $V=0°$ illustrated in FIGS. 19 and 20. The parallel light beam L11 is a light beam with a peripheral view angle which is emitted from a pixel in a peripheral section of the image display element 11, and is converted into a light beam with a predetermined view angle (a predetermined view angle with respect to a normal to the surface of the light guide plate 13) by the collimating optical system 12 to enter the light guide plate 13. The parallel light beam L11 corresponds to a light beam with a view angle $+\theta$ of illustrated in FIGS. 19 and 20. The parallel light beam L12 is a light beam with another peripheral view angle which is emitted from a pixel in the another peripheral section of the image display element 11, and is converted into a light beam with another predetermined view angle (another predetermined view angle with respect to the normal to the surface of the light guide plate 13) by the collimating optical system 12 to enter the light guide plate 13. The parallel light beam L12 corresponds to a light beam with a view angle $-\theta$ illustrated in FIGS. 19 and 20.

The light guide plate 13 receives, for each of the N kinds of wavelength bands, a plurality of parallel light beams with different traveling directions through the collimating optical system 12, and guides the received parallel light beams according to principle of total inner reflection. The light guide plate 13 is a light guide plate in the shape of a thin parallel plate including, as main surfaces, an optical surface 13a and an optical surface 13b facing the optical surface 13a. The optical surface 13a has a light inlet 13a1 at one end thereof to receive the parallel light beams with different view angles emitted from the collimating optical system 12. The optical surface 13a has a light outlet 13a2 at the other end thereof to emit light. On the optical surface 13b, the first reflection type volume hologram grating 14, hereinafter described as the first grating 14, is arranged in a position facing the light inlet 13a1 of the optical surface 13a, and the second reflection type volume hologram grating 15, hereinafter described as the second grating 15, is arranged in a position facing the light outlet 13a2 of the optical surface 13a.

The first grating 14 diffracts and reflects the parallel light beams for each of the wavelength bands which have entered the light guide plate 13, so as to be reflected inside the light guide plate 13 according to the principle of total inner reflection. The second grating 15 diffracts and reflects the parallel light beams which have propagated inside the light guide plate 13 according to the principle of total inner reflection, so as to be emitted from the light guide plate 13 as they are in parallel. The first and second gratings 14 and 15 each have a diffraction configuration which includes N kinds of interference fringes each corresponding to the N kinds of the wavelength bands, and interference fringes each corresponding to the N kinds of the wavelength bands are recorded with uniform pitches p on a hologram surface.

Figure 2:
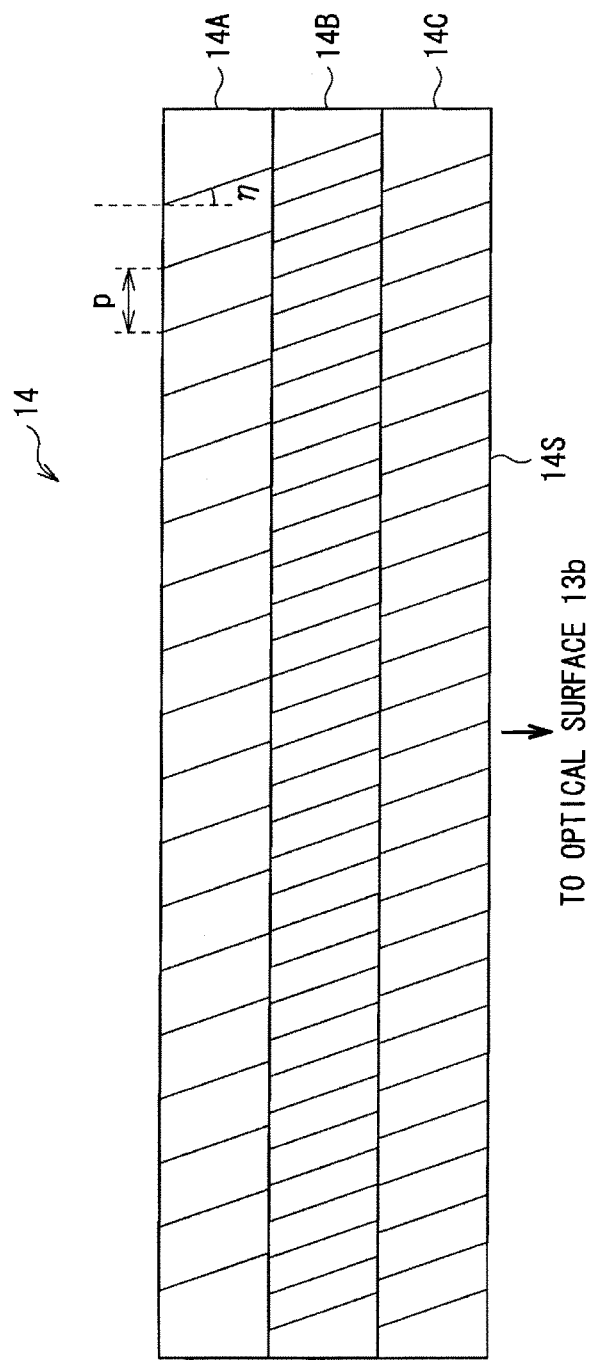
FIG. 2 is a side view illustrating a configuration example of a first reflection type volume hologram grating in the virtual image display according to an embodiment.
Figure 3:
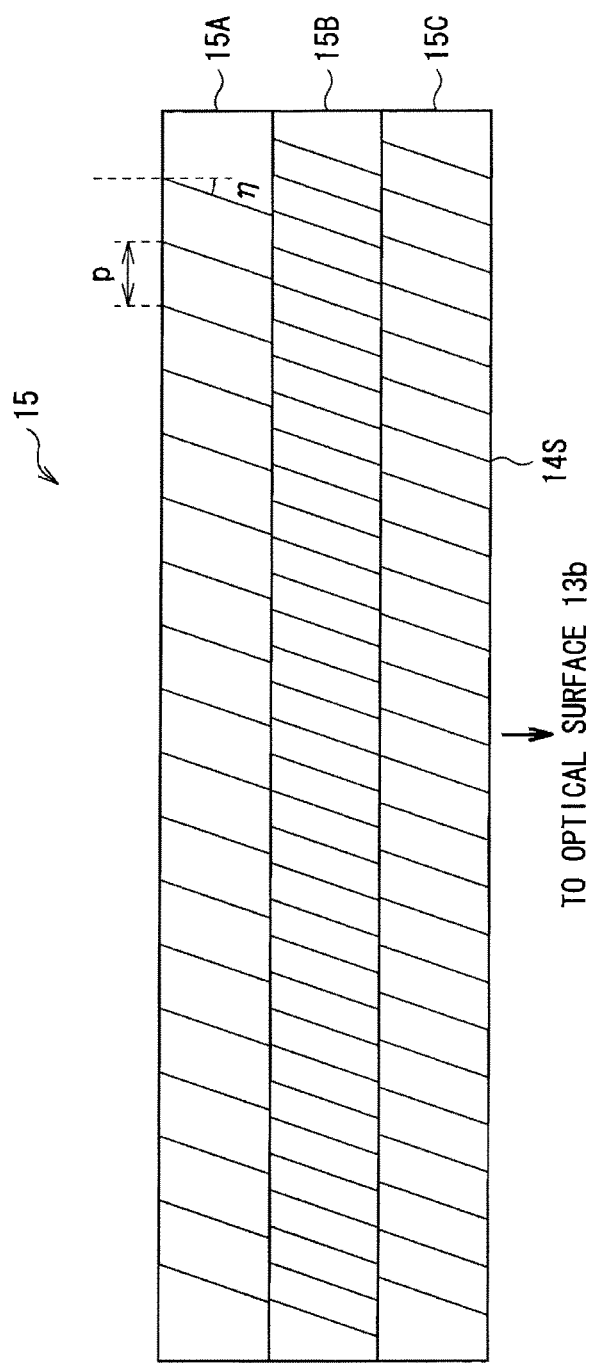
FIG. 3 is a side view illustrating a configuration example of a second reflection type volume hologram grating in the virtual image display according to an embodiment.

FIGS. 2 and 3 illustrate configuration examples of the first and second gratings 14 and 15 each having a diffraction configuration for three kinds (N=3) of wavelength bands, for example, red, blue and green. As illustrated in FIG. 2, the first grating 14 is formed, for example, by laminating three layers, that is, hologram layers 14A, 14B and 14C. For example, interference fringes diffracting and reflecting mainly red light are recorded in the hologram layer 14A, and interference fringes diffracting and reflecting mainly blue light are recorded in the hologram layer 14B, and interference fringes diffracting and reflecting mainly green light are recorded in the hologram layer 14C. In each of the hologram layers 14A, 14B and 14C, for example, interference fringes with the same slant angle (slant of the interference fringes) η are recorded. The interference fringes in the hologram layer 14A, the interference fringes in the hologram layer 14B and the interference fringes in the hologram layer 14C are recorded with different pitches from one another. Moreover, interference fringes in each of the hologram layers 14A, 14B and 14C are recorded with the same pitches irrespective of position. In other words, when the pitches between the interference fringes recorded in the hologram layer 14A is p, the interference fringes in the other hologram layers 14B and 14C are recorded with pitches different from the pitches p.

The second grating 15 has a configuration symmetrical to that of the first grating 14. As illustrated in FIG. 3, as in the case of the first grating 14, the second grating 15 is formed, for example, by laminating three layers, that is, hologram layers 15A, 15B and 15C. For example, interference fringes diffracting and reflecting mainly red light are recorded in the hologram layer 15A, and interference fringes diffracting and reflecting mainly blue light in the hologram layer 15B, and interference fringes diffracting and reflecting mainly green light are recorded in the hologram layer 15C. In each of the hologram layers 15A, 15B and 15C, for example, interference fringes with the same slant angle η are recorded. The interference fringes in the hologram layer 15A, the interference fringes in the hologram layer 15B and the interference fringes in the hologram layer 15C are recorded with different pitches from one another. Moreover, interference fringes in each of the hologram layers 15A, 15B and 15C are recorded with the same pitches irrespective of position.

Moreover, the first and second gratings 14 and 15 have a configuration satisfying the following condition for each of the wavelength bands where a central diffraction wavelength defined as a diffraction wavelength at a central view angle (the reference view angle V) for each of the wavelength bands (for interference fringes of each color) is L, and the peak wavelength of the plurality of parallel light beams, for each of the wavelength bands, entering the light guide plate 13 is P.

$P > L$

Functions and effects by satisfying the condition will be described in detail later.

Figure 4:
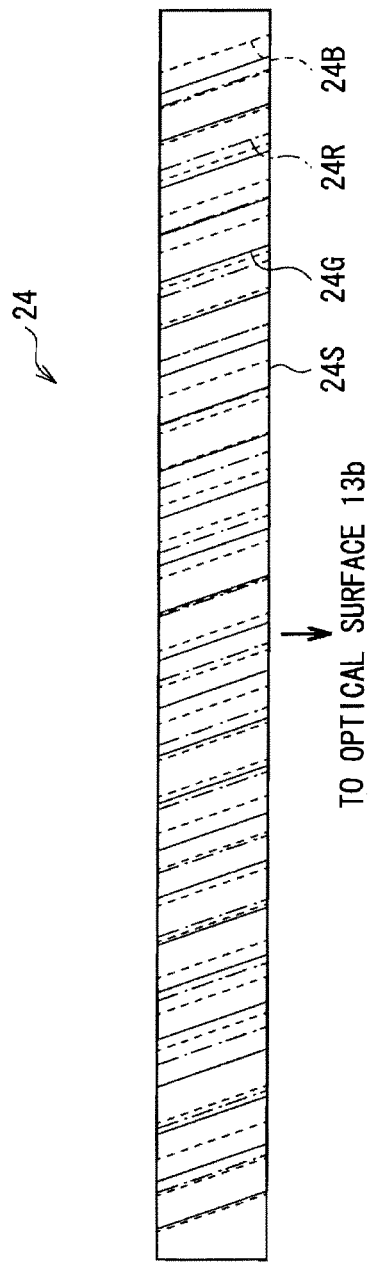
FIG. 4 is a side view illustrating another configuration example of the first reflection type volume hologram grating in the virtual image display according to an embodiment.
Figure 5:
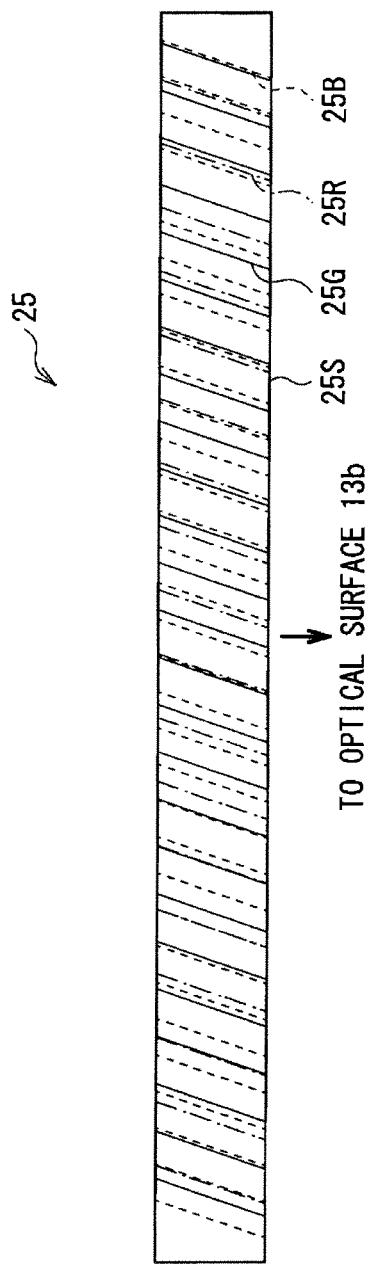
FIG. 5 is a side view illustrating another configuration example of the second reflection type volume hologram grating in the virtual image display according to an embodiment.

FIGS. 4 and 5 illustrate diffraction configurations in other configuration examples different from the configurations illustrated in FIGS. 2 and 3. In the configuration examples, interference fringes corresponding to N kinds of wavelength bands are multiplexed and recorded in the same layer. In a first reflection type volume hologram grating 24, hereinafter described in the first grating 24, illustrated in FIG. 4, three kinds of interference fringes diffracting and reflecting red light, green light and blue light, that is, red light interference fringes 24R, green light interference fringes 24G, and blue light interference fringes 24B are multiplexed and recorded in the same layer. The three kinds of interference fringes are recorded so that grating pitches on a hologram surface 24S are uniform for each of the three kinds of interference fringes, but different between the three kinds of interference fringes. In other words, when the pitch between the red light interference fringes 24R is p, the green light interference fringes 24G and the blue light interference fringe 24B are formed with different pitches from the pitch p. Moreover, the three kinds of interference fringes are recorded, for example, at the same slant angle η.

A second reflection type volume hologram grating 25, hereinafter described the second grating 25, illustrated in FIG. 5 has a configuration symmetric to that of the first grating 24 illustrated in FIG. 4. As illustrated in FIG. 5, in the second grating 25, as in the case of the first grating 24, three kinds of interference fringes, that is, red light interference fringes 25R, green light interference fringes 25G and blue light interference fringes 25B are multiplexed and recorded in the same layer. The three kinds of interference fringes are recorded so that grating pitches on a hologram surface 25S are uniform for each of the three kinds of interference fringes, but different between the three kinds of interference fringes. In other words, when the pitch between the red light interference fringes 25R is p, the green light interference fringes 25G and the blue light interference fringes 25B are formed with different pitches from the pitch p. Moreover, the three kinds of interference fringes are recorded, for example, at the same slant angle η.

Next, the operation of the virtual image display configured in the above-described manner will be described below.

In the virtual image display 10, the parallel light beams with different view angles entering from the light inlet 13a1 of the light guide plate 13 through the collimating optical system 12 enters the first grating 14, and each of the parallel light beams is diffracted and reflected as it is. The diffracted and reflected parallel light beams travel while being repeatedly totally reflected between the optical surface 13a and the optical surface 13b of the light guide plate 13 to enter the second grating 15. The light guide plate 13 is designed to have a sufficient length in a longitudinal direction and a thin thickness between the optical surface 13a and the optical surface 13b so as to have such an optical path length that the numbers of times of the total reflection of the parallel light beams with different view angles, while traveling inside the light guide plate 13 until the parallel light beams arrive at the second grating 15, depend on their view angles. More specifically, among the parallel light beams entering the light guide plate 13, the parallel light beam L11 entering at a view angle +θ while being slanted toward the second grating 15, that is a parallel light beam with a large incident angle is reflected a smaller number of times than the parallel light beam L12 entering at a view angle −θ which is in an opposite direction to the view angle +θ.

The parallel light beams with view angles entering the second grating 15 are diffracted and reflected thereby to deviate from conditions of total reflection, and then the parallel light beams are emitted from the light outlet 13a2 of the light guide plate 13 to enter a viewer's pupil 16.

In the virtual image display 10, the second grating 15 and the first grating 14 are arranged on the optical surface 13b of the light guide plate 13 so that interference fringes recorded in the second grating 15 and interference fringes recorded in the first grating 14 are 180-degree rotationally symmetric to each other in a hologram plane. Therefore, the parallel light beams is reflected by the second grating 15 at an angle equal to an incident angle to the first grating 14, so a display image is displayed on the viewer's pupil 16 with high resolution without being blurred.

Moreover, since the virtual image display 10 includes the first grating 14 and the second grating 15 which do not work as any lens, monochromatic eccentric aberration and diffraction chromatic aberration may be eliminated or reduced. The first grating 14 and the second grating 15 are arranged so that a hologram plane 14S of the first grating 14 and a hologram plane 15S of the second grating 15 are parallel to the optical surface 13b of the light guide plate 13. However, the application is not limited thereto, and the hologram planes 14S and 15S may be arranged so as to have a predetermined angle with respect to the optical surface 13b.

Next, functions and effects in the case where the above-described central diffraction wavelength L and the peak wavelength P of the parallel light beams satisfy a predetermined relationship will be described below. In the following description, a single wavelength band, specifically a red wavelength band is used as an example, but in the case where light for a plurality of wavelength bands including other wavelength bands (a blue wavelength band, a green wavelength band or the like) is used, when the central diffraction wavelength L and the peak wavelength P corresponding to each of the plurality of wavelength bands satisfy the same relationship, the same functions and effects are obtained.

FIG. 6 illustrates a relationship between an incident or emission view angle and a central diffraction wavelength in the first or second grating 14 or 15. Examples of values illustrated in FIG. 6 are values under the following specifications. In addition, in the values illustrated in FIG. 6, the view angle θ of a minus value corresponds to a view angle −θ illustrated in FIGS. 19 and 20 in the case where the second grating 15 is used as an example.

Specifications

Surface pitch p of first or second grating=0.535 μm

Slant (slant angle) η of interference fringe=64.5 degrees

Wavelength band λ (peak wavelength) of light beam entering light guide plate=635 nm Refractive index n of light guide plate=1.52

Peripheral view angles ±θ=±8 degrees

The central diffraction wavelength of the first or second reflection type volume hologram gratings 14 or 15 under the above-described specifications are continuously shifted by the view angle as illustrated in FIG. 6, because Bragg conditions are changed depending on the incident angle of the parallel light beam. In other words, as the view angle increases, the central diffraction wavelength increases, and it is found out that the central diffraction wavelengths at a view angle +θ, the central view angle V (=0 degrees) and a view angle −θ are 660 nm, 635 nm and 605 nm, respectively.

Now, as described above referring to FIG. 20, the view angle of a parallel light beam which is totally reflected inside the second grating 15 a larger number of times causes an increase in the number of times the light beam is diffracted and reflected by the second grating 15, thereby an image is dark when a viewer observes the image. For example, when the diffraction efficiency of the second grating 15 is 30%, and the intensity of a light beam entering the second grating 15 for the first time is 100%, the intensity of the light beam diffracted and reflected for the first time to be emitted is 30%, and the intensity of the emitted light beam diffracted and reflected for the second time is 21% because 30% of the intensity (70%) of the light beam not diffracted and reflected for the first time is diffracted, and in the same manner, the intensity of the light beam diffracted and reflected for the third time to be emitted is 14.7%, and the intensity of the light beam diffracted and reflected for the fourth time to be emitted is 10.29%. Thus, the intensity of a light beam with a view angle which is viewable by being diffracted and reflected for the fourth time is about ⅓ of the intensity of a light beam with a view angle which is viewable by being diffracted and reflected for the first time. Such a decline in light intensity occurs even in the case where the diffraction efficiency of the second grating 15 is changed.

Figure 7:
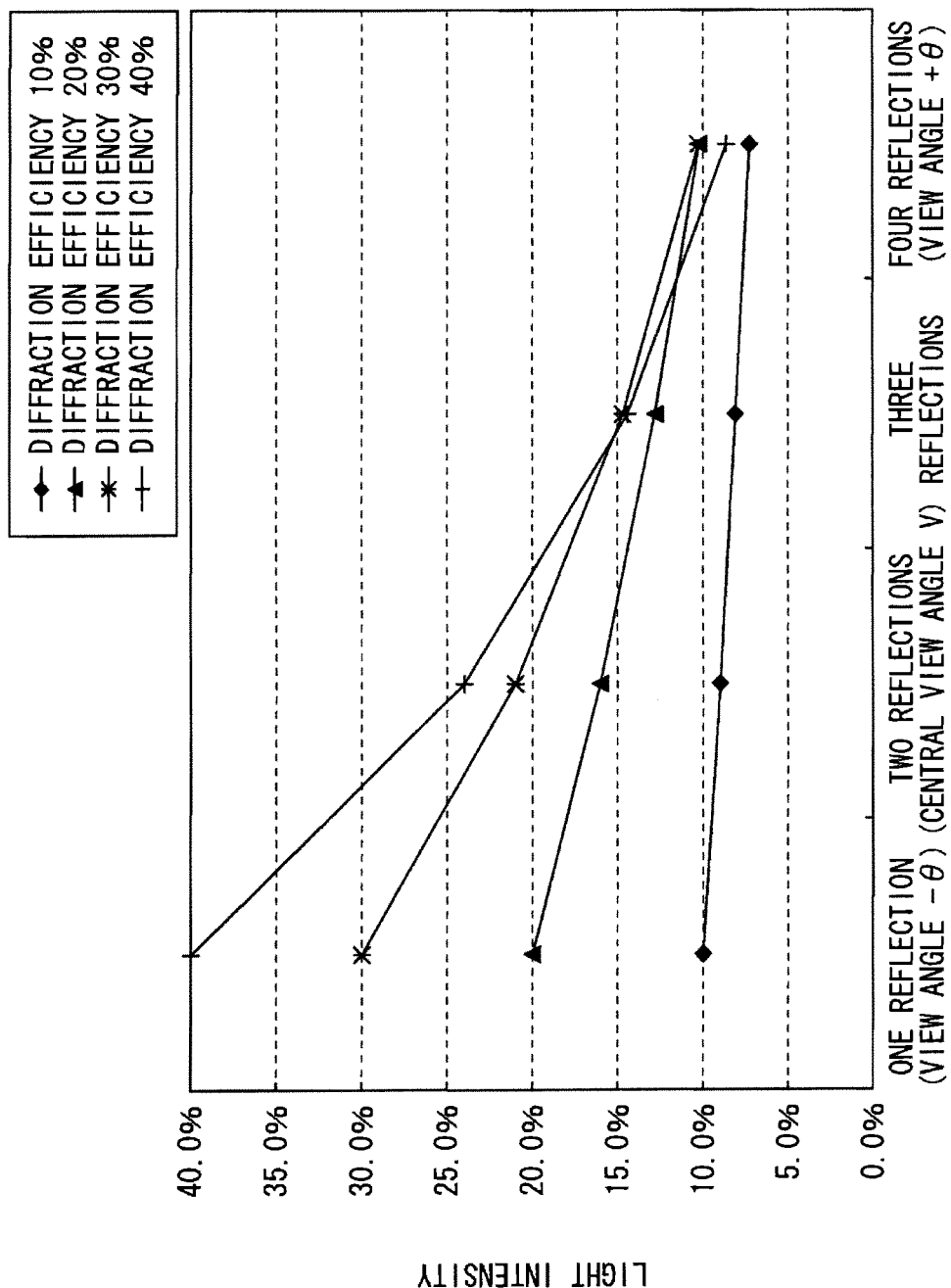
FIG. 7 is an illustration of a relationship between the number of diffraction-reflections and the intensity of emitted light in the second reflection type volume hologram grating.

Moreover, as illustrated in FIG. 7, it is found out that even in the case where the diffraction efficiency is changed within a range of 10% to 40%, the larger the number of times light with a view angle is diffracted and reflected, the more the intensity of the light with the view angle is reduced in principle. FIG. 7 illustrates a relationship between the number of times light is internally diffracted and reflected and the intensity of emitted light in the second grating 15 in the case where the diffraction efficiency is changed.

Figure 8:
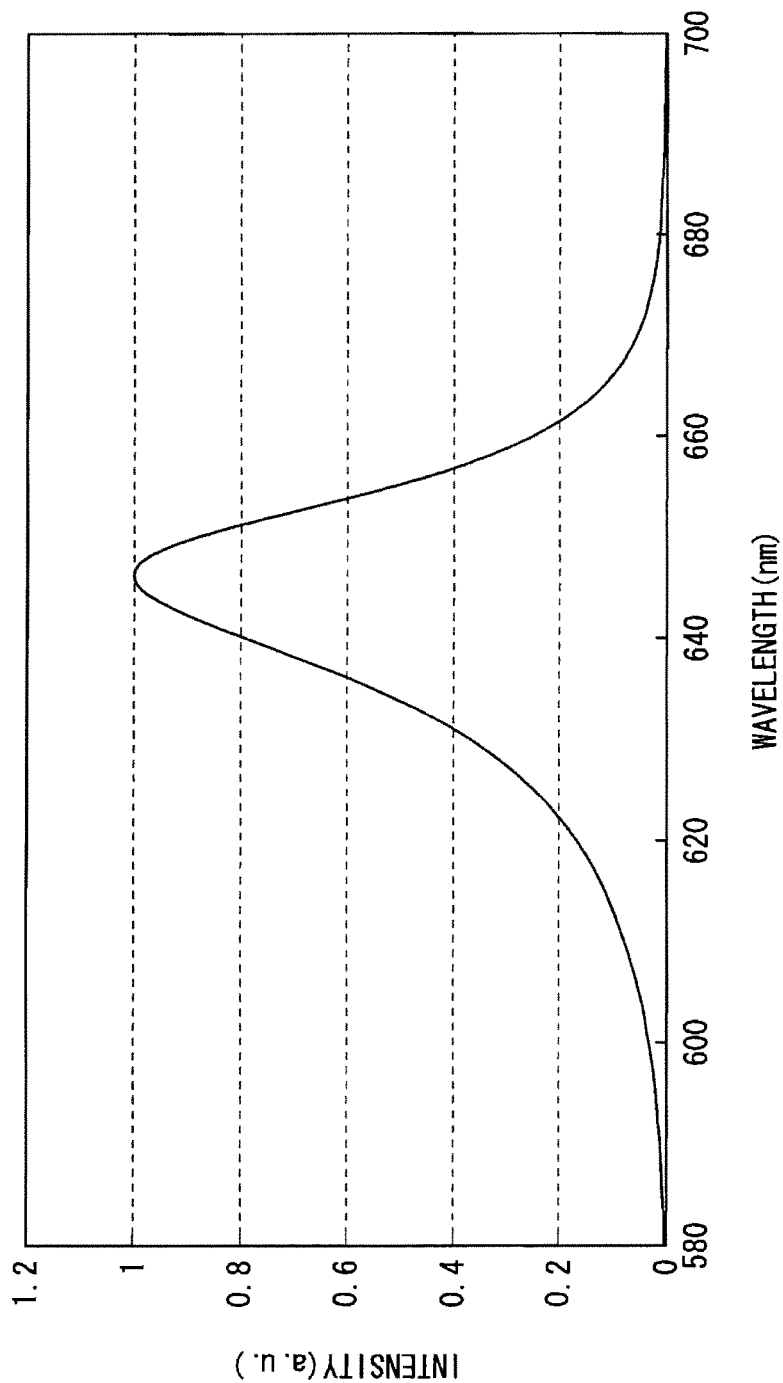
FIG. 8 is a plot illustrating an example of a spectrum distribution of a red LED.

On the other hand, for example, in the case where a red LED with a spectrum distribution having a peak around 650 nm as illustrated in FIG. 8 is used as a light source of the image display element 11, the spectrum distribution of light with each view angle which is diffracted and reflected from the second grating 15 is represented by the product of the diffraction efficiency distributions of the first and second gratings 14 and 15 in which the central diffraction wavelength is shifted by the spectrum distribution of the LED and Bragg conditions.

Figure 9:
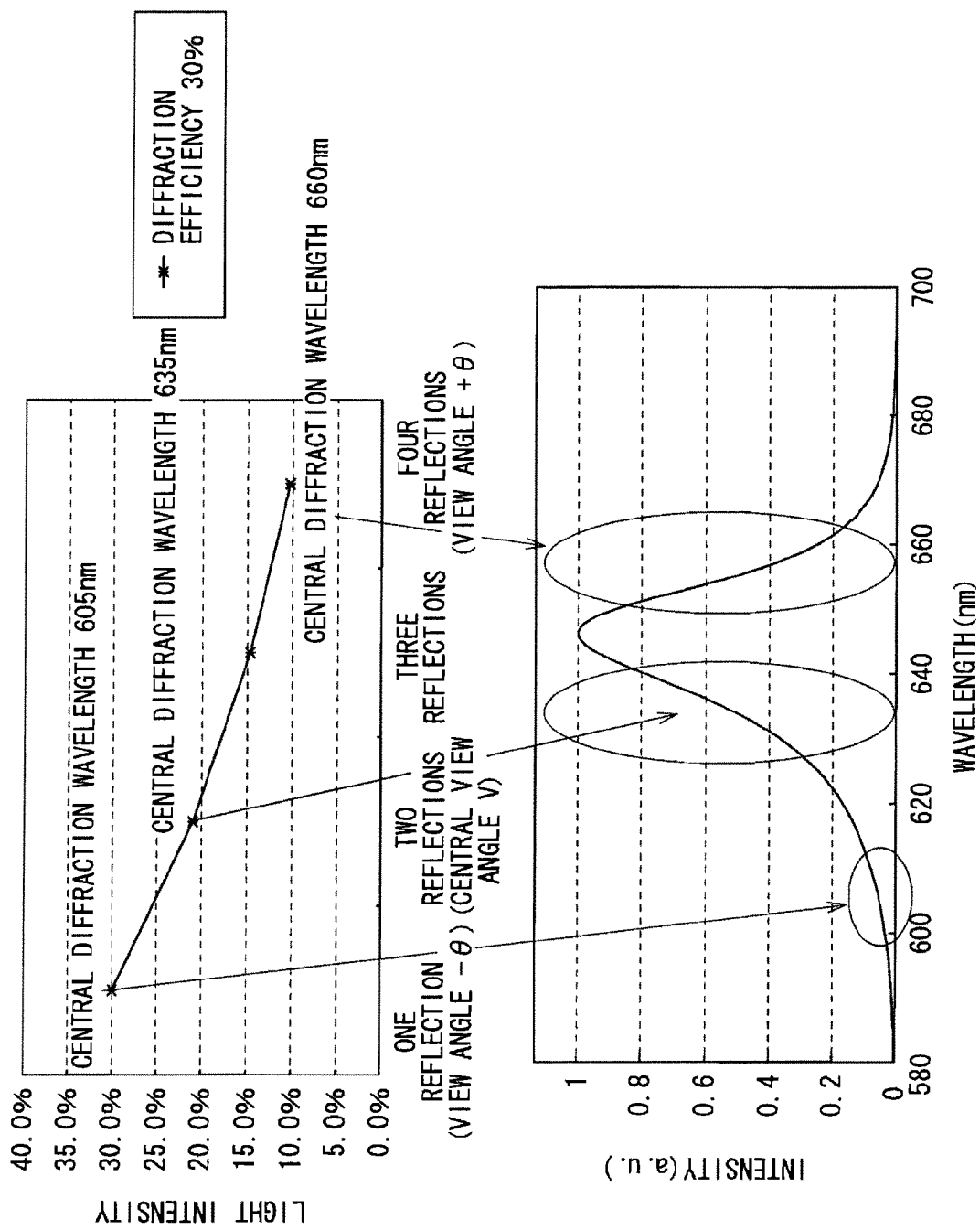
FIG. 9 is an illustration about a method of striking a light intensity balance between light beams with incident view angles.

In the embodiment, to solve an issue of the above-described decline in light intensity, as illustrated in FIG. 9, the peak wavelength of the LED is brought near the central diffraction wavelength of a light beam with a view angle which is diffracted and reflected a large number of times, for example, 3 or 4 times thereby to compensate for a decline in light intensity of the light beam with a view angle which is diffracted and reflected a large number of times and to increase the intensity of the light beam with the view angle. Therefore, the light intensity balance between light beams with different view angles is struck. In other words, it means that when a center wavelength (a central diffraction wavelength at a view angle of 0 degrees) for a wavelength band diffracted and reflected by the first and second gratings 14 and 15 is L (635 nm), and the peak wavelength of the parallel light beams having the spectrum distribution of the LED entering the light guide plate 13 for the wavelength band is P (648 nm), a relationship between them is represented by the following relationship.

$$P > L$$

Next, a specific example of the virtual image display 10 according to the embodiment will be described below.

Figure 10:
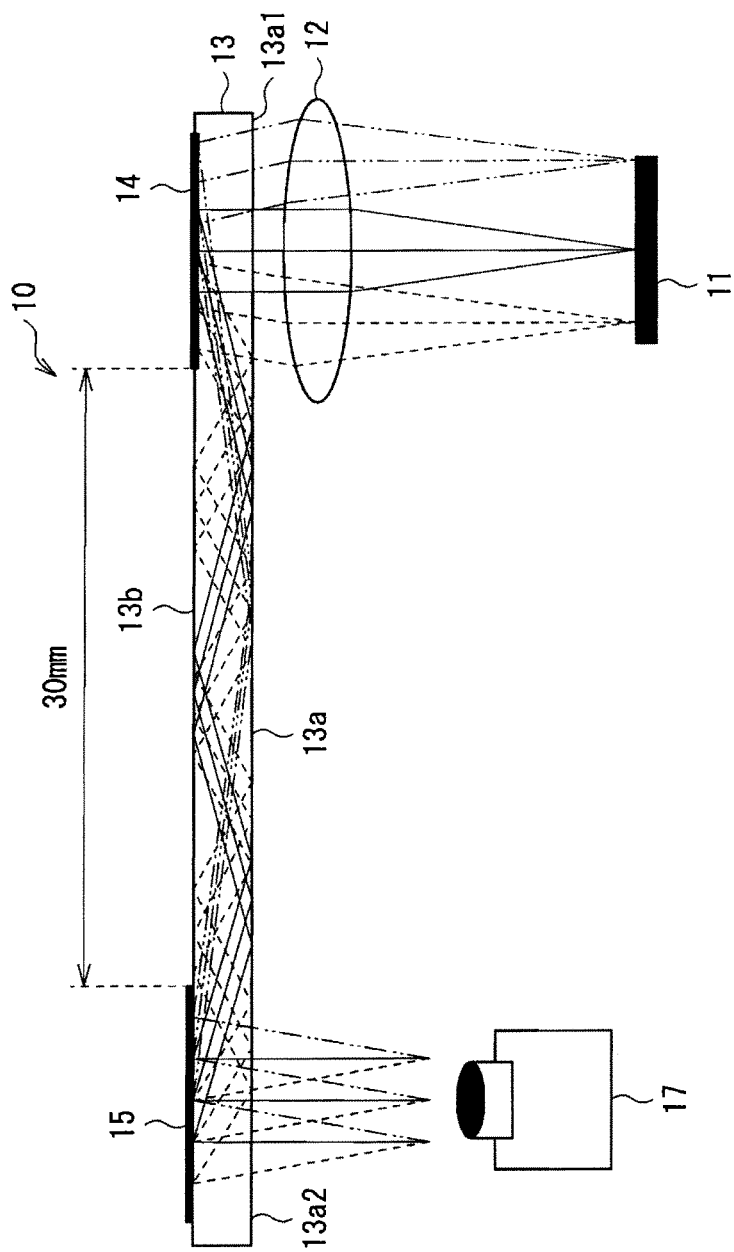
FIG. 10 is a side view illustrating the configuration of a virtual image display in an example of the application used for measurement of light intensity distribution.

FIG. 10 illustrates the configuration of the virtual image display 10 in the example. In the example, the virtual image display 10 was formed so that the thickness of the first grating 14 was 7 μm, and the thickness of the second grating 15 was 5 μm, and the surface pitches p of the first and second gratings 14 and 15 was 0.531 μm, and the slant angle η of the interference fringe was 64.5 degrees, and Δn was 0.05. In this case, "Δn" represents a modulated width of the refractive index of each of the first and second gratings 14 and 15 diffracting and reflecting light beams by the periodical modulation of the refractive index in a medium. The first and second gratings 14 and 15 were arranged on the light guide plate 13 with a thickness of 1 mm so as to have a space of 30 mm therebetween, and the parallel light beams emitted from the image display element 11 and collimated at a view angle of ±8 degrees by the collimating optical system 12 was allowed to enter the first grating 14, and a virtual image was observed by the CCD camera 17 at the viewer's pupil position O.

Figure 11:
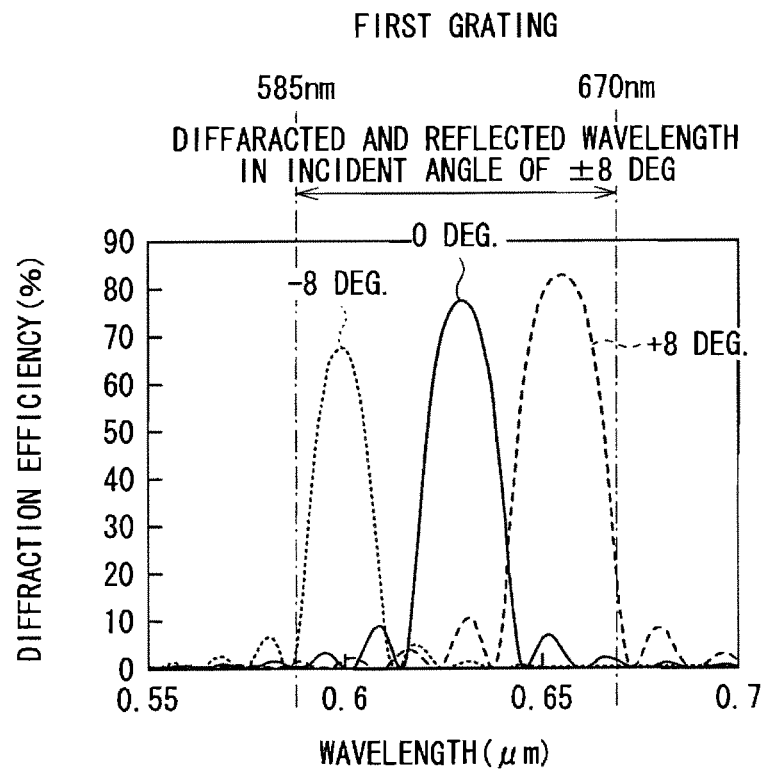
FIG. 11 is a plot illustrating a diffraction-reflection spectrum distribution of a first reflection type volume hologram grating in the example according to an embodiment.
Figure 12:
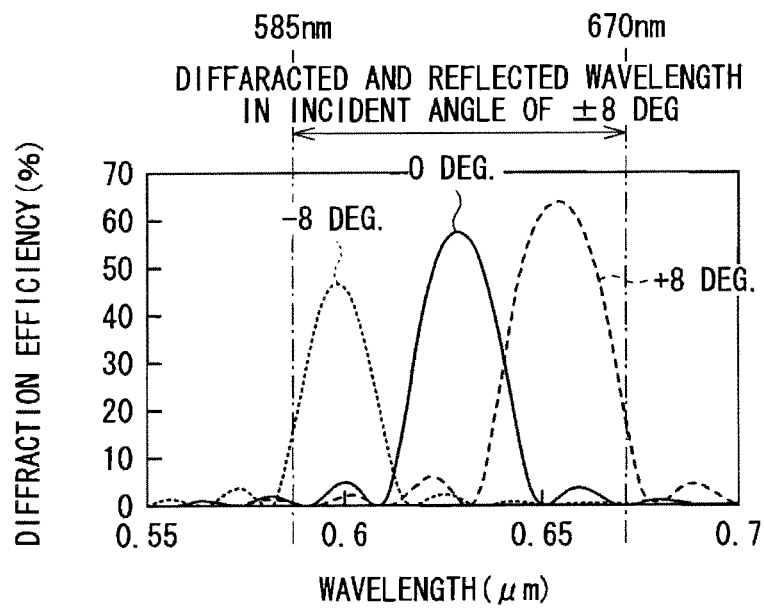
FIG. 12 is a plot illustrating a diffraction-reflection spectrum distribution of a second reflection type volume hologram grating in the example according to an embodiment.

The wavelength band diffracted and reflected by the first and second gratings 14 and 15 in the example was 585 nm to 670 nm in a range of the view angle (i.e., incident angle) of ±8 degrees as illustrated in FIGS. 11 and 12, and the central wavelength was substantially equal to a diffraction wavelength of 630 nm at the central view angle of 0 degrees. FIG. 11 illustrates the diffraction reflection spectrum of the first grating 14, and FIG. 12 illustrates the diffraction reflection spectrum of the second grating 15.

Figure 13:
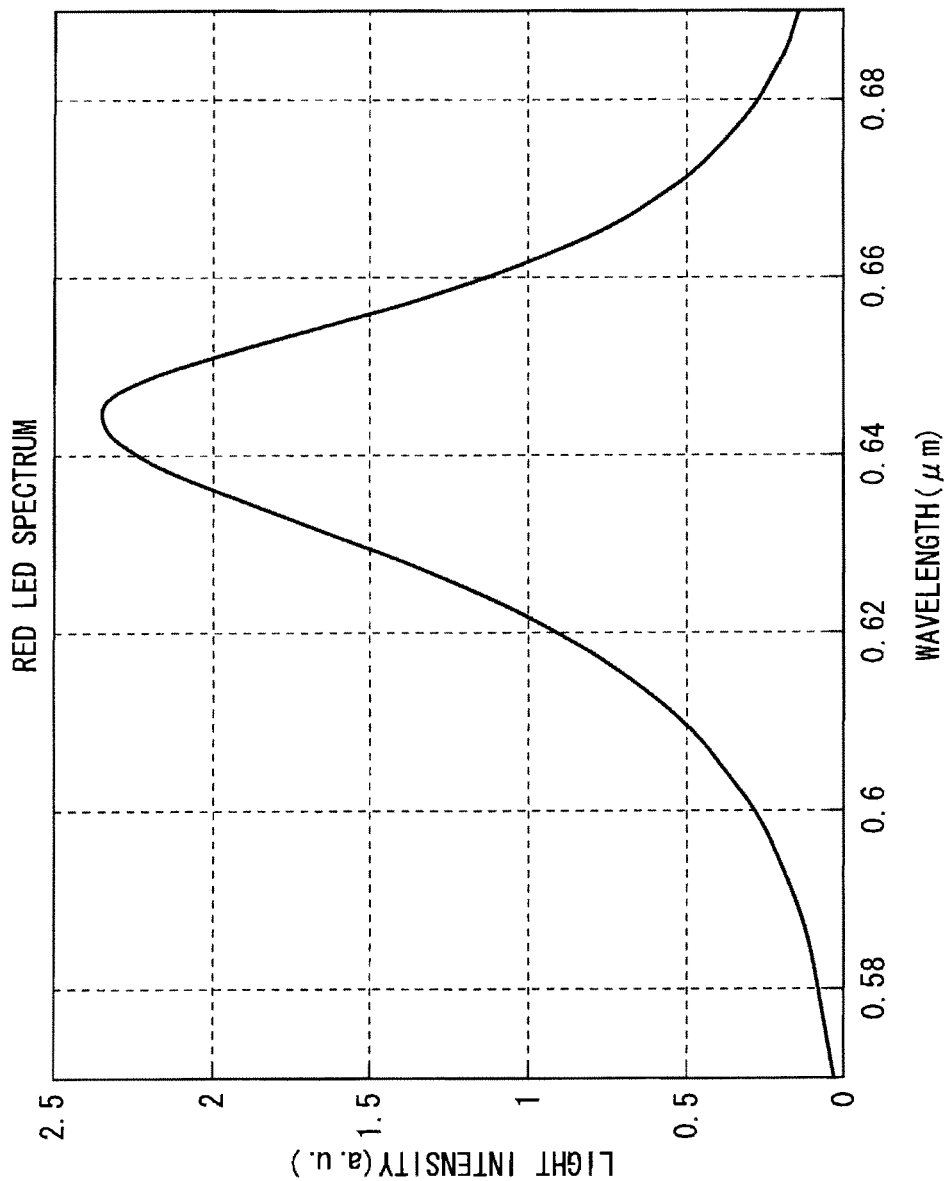
FIG. 13 is a plot illustrating a spectrum distribution of a red LED in the example according to an embodiment.
Figure 14:
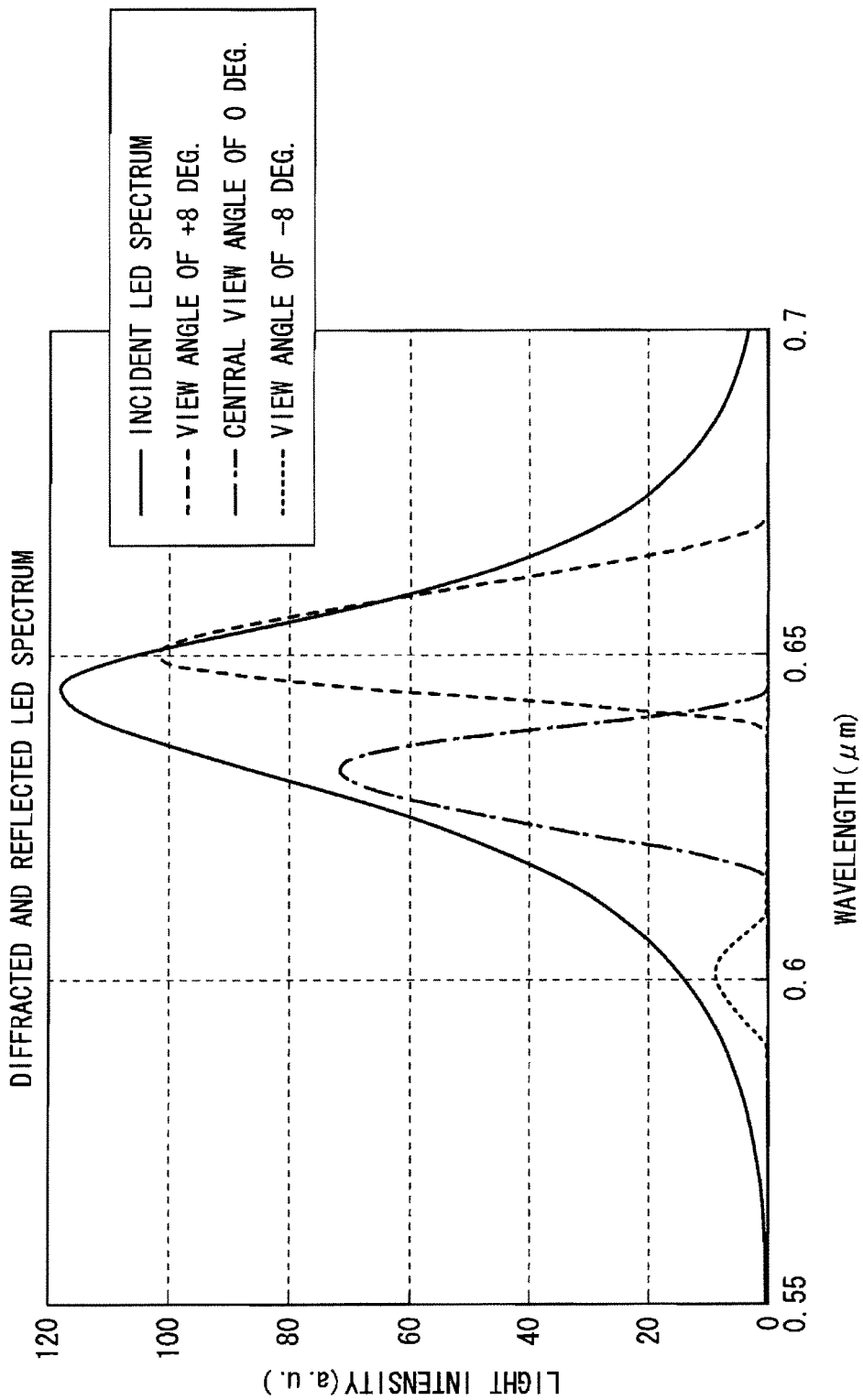
FIG. 14 is a plot illustrating a spectrum distribution in a red wavelength band diffracted and the reflected by the second reflection type volume hologram grating in the example according to an embodiment.

FIG. 13 illustrates the spectrum distribution of a light source (the red LED) illuminating the image display element 11 used in the example. The diffraction efficiency distributions at each view angle of the first and second gratings 14 and 15 are as illustrated in FIGS. 11 and 12, and in the case where a light source illustrated in FIG. 13 is used, the LED spectrums of light beams, diffracted and reflected by the second grating 15, at the view angle of ±8 degrees and the central view angle are as illustrated in FIG. 14.

Figure 15:
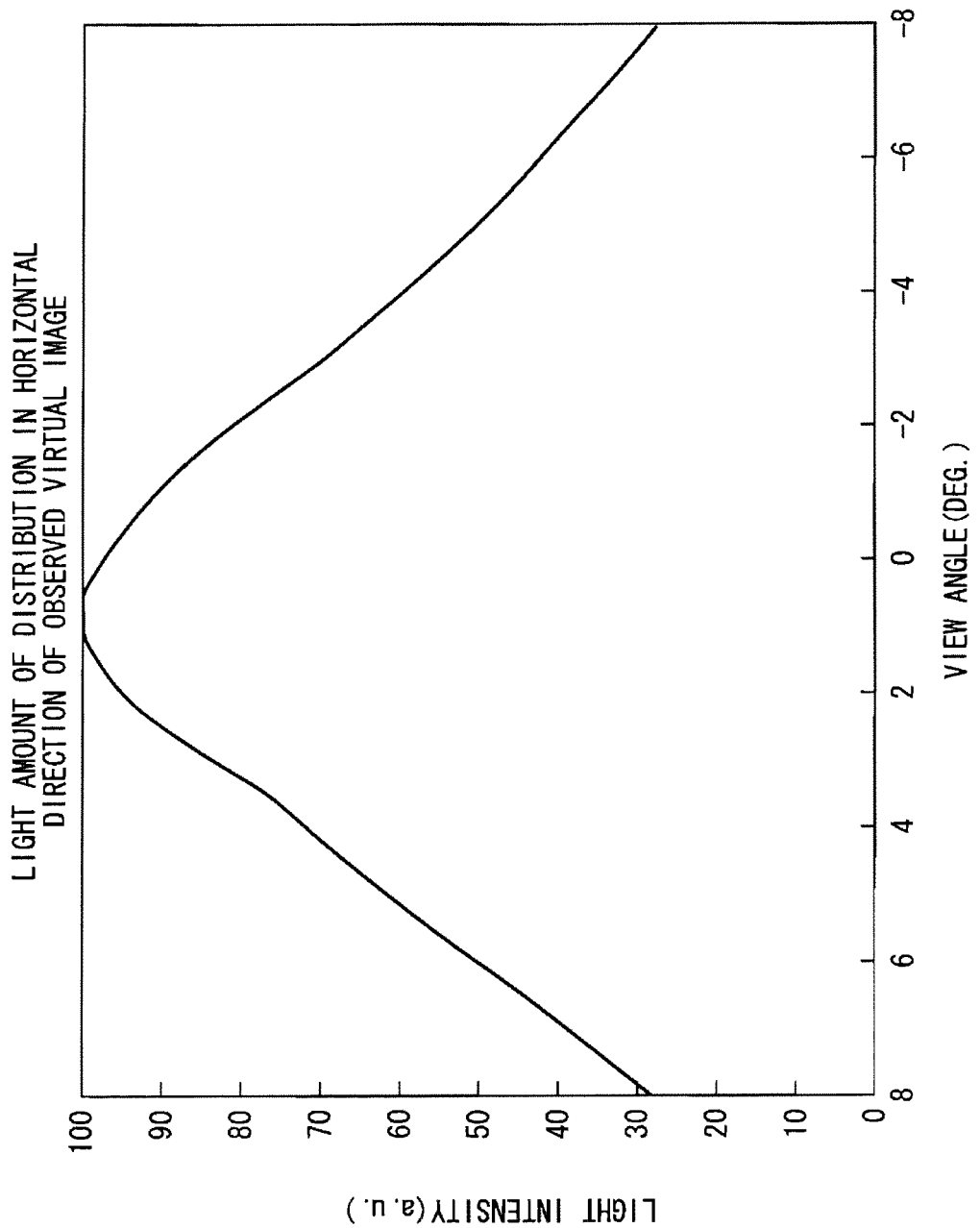
FIG. 15 is a plot illustrating a light intensity distribution of a red wavelength band in a virtual image observation position in the example according to an embodiment.

A result obtained by measuring a light intensity distribution in a horizontal direction of a virtual image plane observed in the viewer's pupil position O in the example by the CCD camera 17 is illustrated in FIG. 15. The peak wavelength of the red LED at this time was 645 nm, and the peak wavelength compensated for a decline in the intensity of a light beam with a view angle of +8 degrees by diffracting and reflecting the light beam a plurality of times. Then, a relationship between the central wavelength L (630 nm) for a wavelength band diffracted and reflected by the first and second gratings 14 and 15 and the peak wavelength P=645 nm of the parallel light beams by the red LED in the example, which entered the light guide plate 13 for the wavelength band satisfied the following relationship.

$$P > L$$

Figure 16:
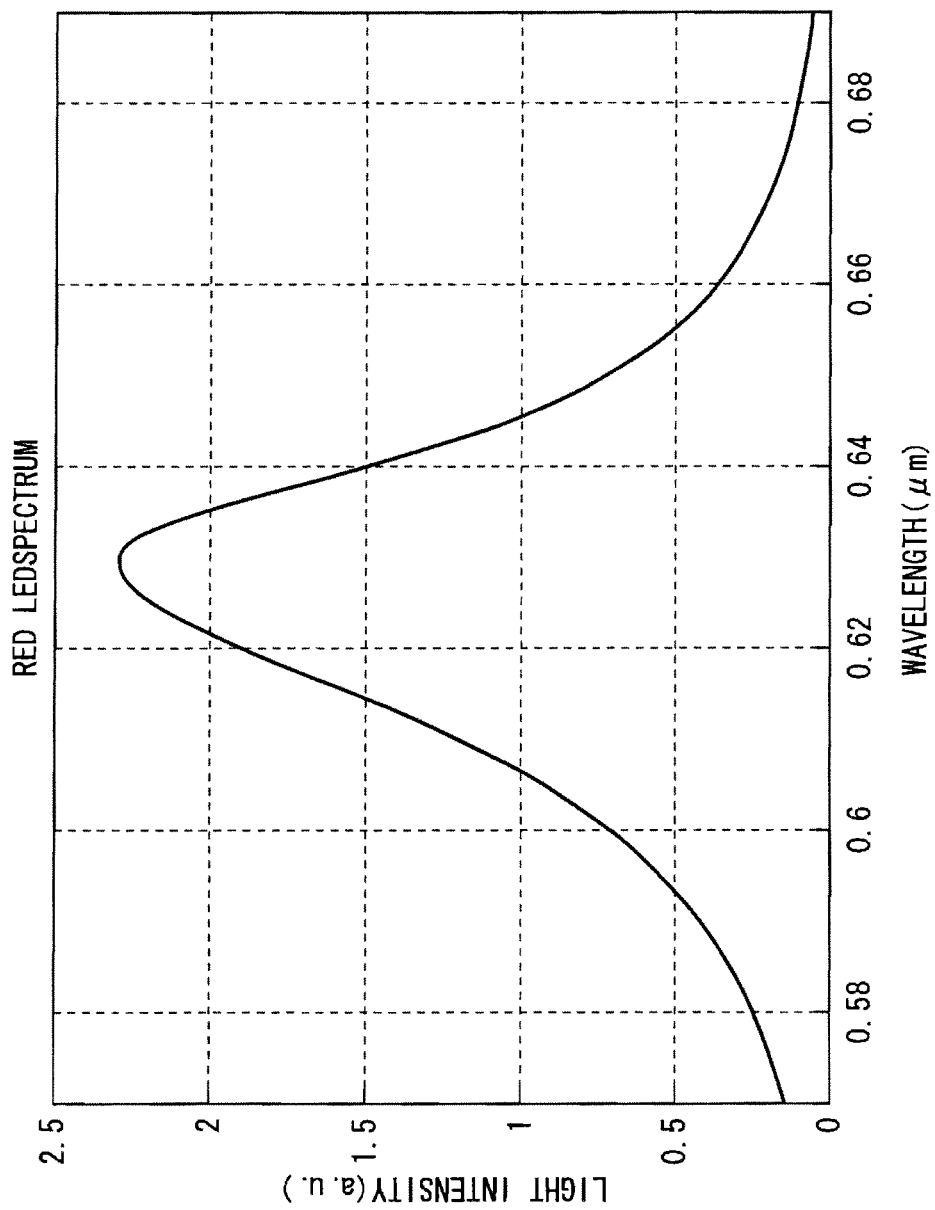
FIG. 16 is a plot illustrating a spectrum distribution of a red LED in a comparative example.
Figure 17:
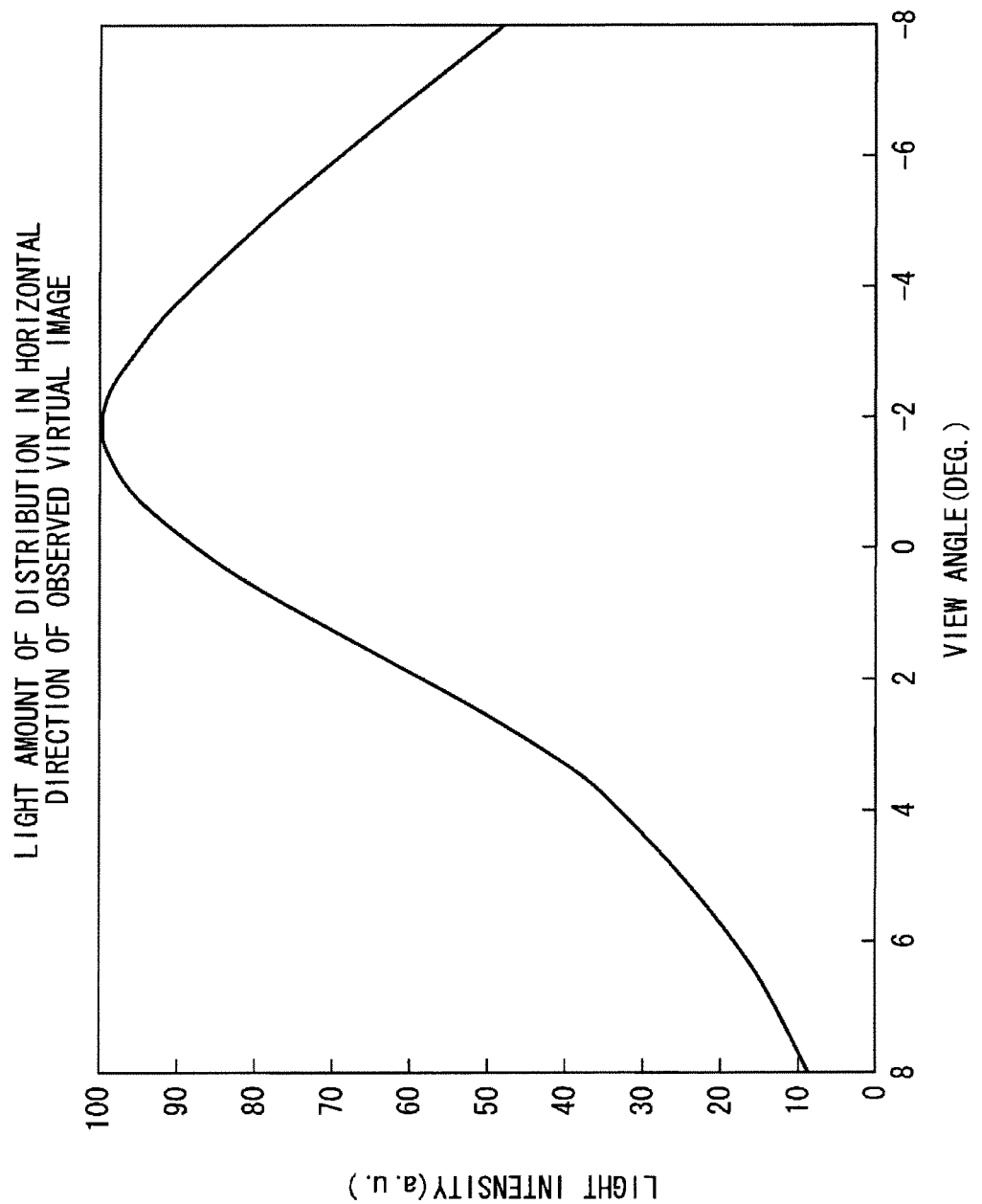
FIG. 17 is a plot illustrating a light intensity distribution of a red wavelength band in a virtual image observation position in the comparative example.

Next, as a comparative example, measurement was performed in the case where a red LED having a spectrum distribution illustrated in FIG. 16 was used as a light source illuminating the image display element 11. A result obtained by measuring the light intensity distribution in a horizontal direction of a virtual image plane observed in the viewer's pupil position O is illustrated in FIG. 17. In the comparative example, the peak wavelength of the red LED was 630 nm, and a relationship, between the central wavelength L=635 nm for a wavelength band where light beams were diffracted and reflected by the first and second gratings 14 and 15 and the peak wavelength P=630 nm of the plurality of parallel light beams by the red LED entering the light guide plate 13 for the wavelength band, did not satisfy the above relationship.

It was evident from a comparison between the results obtained by measuring the light intensity distributions illustrated in FIGS. 15 and 17 that in the case of the comparative example in FIG. 17 in which the relationship did not satisfy P>L, the intensity of a light beam with a view angle which was reflected a smaller number of times is higher, and the intensity of a light beam with a view angle which was reflected a larger number of times was lower, so a virtual image displayed thereby was not appropriate as an observed image. On the other hand, in the case of the example in FIG. 15 in which the relationship satisfied the above relationship, the luminance at the central view angle in the observed virtual image was the highest, and as the view angle increased in positive or negative directions, the luminance gradually declined. This was a natural state as an observed image, and the light intensity balance between light beams with different view angles was struck.

In the above-described example, the case where the relationship P>L is satisfied by changing the spectrum distribution of the light source of the image display element 11 is described. However, the relationship P>L may be satisfied by changing the diffraction configurations of the first and second gratings 14 and 15.

As described above, in the virtual image display 10 according to the embodiment, the central diffraction wavelength L in the first and second gratings 14 and 15 and the peak wavelength P of the parallel light beams entering the light guide plate 13 satisfy a predetermined relationship so as to compensate for a decline in intensity of the light beam with a view angle which is diffracted and reflected a large number of times in the second grating 15, so the light intensity balance between light beams with different view angles is favorably maintained, and virtual images with less unevenness in brightness may be observed.

Other Embodiment

The present application is not limited to the above-described embodiment, and may be variously modified.

Figure 18:
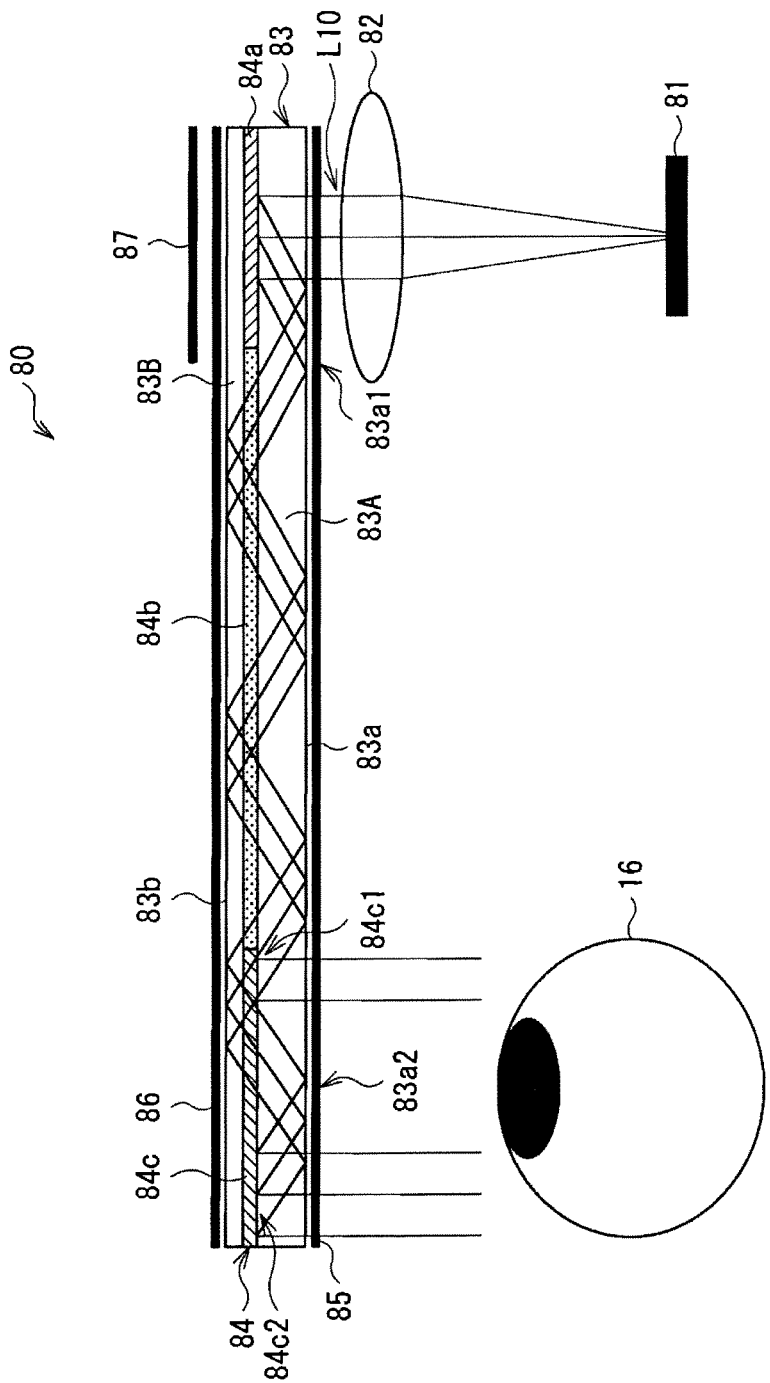
FIG. 18 is a side view illustrating a configuration example of a virtual image display in related art.

For example, the present application is applicable to a configuration example of a virtual image display 80 illustrated in FIG. 18, as in the case of the configuration example illustrated in FIG. 1. More specifically, it is only necessary for first and second gratings 84a and 84c in the virtual image display 80 to be configured so that a central diffraction wavelength L at a central view angle satisfies the following relationship with a peak wavelength P of parallel light beams which is to enter a light guide plate 83.

$$P > L$$

Moreover, the present application is applicable to apparatuses displaying an enlarged virtual image in substantially the same principle as that in the virtual image display illustrated in FIG. 1 or FIG. 18 through the use of a reflection type volume hologram grating.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. An optical device comprising:
   a light source;
   a light guide plate configured to receive light, and to guide the received light;
   a first grating configured to diffract light entering the light guide plate; and
   a second grating configured to diffract light which has been propagated through the light guide plate,
   wherein a peak wavelength of the light source is closer to a central diffraction wavelength of the light with a first view angle having a given magnitude in a first angular direction relative to a zero degree viewing angle and which is diffracted a higher number of times in the second grating than a central diffraction wavelength of the light with a second view angle having the same given magnitude in a second angular direction opposite to the first angular direction and relative to the zero degree viewing angle and which is diffracted a lower number of times in the second grating, and wherein a diffraction efficiency at the first view angle of the first grating is higher than a diffraction efficiency at the second view angle of the first grating.

2. The optical device according to claim 1, wherein an intensity of a first diffracted light by the first grating which corresponds to the first view angle is higher than an intensity of a second diffracted light by the first grating which corresponds to the second view angle.

3. The optical device according to claim 1, wherein interference fringes of the first grating have the same slant angle.

4. The optical device according to claim 1, wherein the optical device is configured, to satisfy a relationship of P>L, where L represents a central diffraction wavelength in the first gratings which corresponds to a central view angle, and P represents a peak wavelength of the light source.

5. The optical device according to claim 1, wherein the peak wavelength of the light source is closer to the central diffraction wavelength of the light with the first view angle than the central diffraction wavelength of the light with the zero degree viewing angle.

6. An optical device comprising:
a light source;
a light guide plate configured to receive light, and to guide the received light;
a first grating configured to diffract light entering the light guide plate; and
a second grating configured to diffract light which has been propagated through the light guide plate,
wherein a peak wavelength of the light source is closer to a central diffraction wavelength of the light with a first view angle having a given magnitude in a first angular direction relative to a zero degree viewing angle and which is diffracted a higher number of times in the second grating than a central diffraction wavelength of the light with a second view angle having the same given magnitude in a second angular direction opposite to the first angular direction and relative to the zero degree viewing angle and which is diffracted a lower number of times in the second grating, and
wherein an intensity of a first diffracted light by the first grating which corresponds to the first view angle is higher than an intensity of a second diffracted light by the first grating which corresponds to the second view angle.

7. The optical device according to claim 6, wherein a diffraction efficiency at the first view angle of the first grating is higher than a diffraction efficiency at the second view angle of the first grating.

8. The optical device according to claim 6, wherein interference fringes of the first grating have the same slant angle.

9. The optical device according to claim 6, wherein the optical device is configured, to satisfy a relationship of P>L, where L represents a central diffraction wavelength in the first gratings which is corresponding to a central view angle, and P represents a peak wavelength of the light source.

10. The optical device according to claim 6, wherein the peak wavelength of the light source is closer to the central diffraction wavelength of the light with the first view angle than the central diffraction wavelength of the light with the zero degree viewing angle.

* * * * *